(12) United States Patent
Miyazawa et al.

(10) Patent No.: US 7,684,648 B2
(45) Date of Patent: Mar. 23, 2010

(54) REDUCING THE SIZE OF A DOCUMENT IMAGE

(75) Inventors: Toshio Miyazawa, Kanagawa-ken (JP); Fumihiro Hasegawa, Tokyo-to (JP); Toshifumi Yamaai, Kanagawa-ken (JP)

(73) Assignee: Ricoh Company, Limited, Tokyo (JP)

( * ) Notice: Subject to any disclaimer, the term of this patent is extended or adjusted under 35 U.S.C. 154(b) by 1079 days.

(21) Appl. No.: 11/332,271

(22) Filed: Jan. 17, 2006

(65) Prior Publication Data

US 2006/0177151 A1 Aug. 10, 2006

(30) Foreign Application Priority Data

Jan. 14, 2005 (JP) ............................. 2005-008348

(51) Int. Cl.
*G06K 9/32* (2006.01)

(52) U.S. Cl. ...................... 382/298; 345/660; 348/581; 358/451

(58) Field of Classification Search .................. 382/100, 382/232, 284, 293, 294, 295, 298, 299; 345/660–671, 345/698, 699; 348/561, 581, 582, 704; 358/451; 708/208
See application file for complete search history.

(56) References Cited

U.S. PATENT DOCUMENTS 5,613,016 A   3/1997   Saitoh

2005/0180645 A1   8/2005   Hasegawa et al.
2005/0180648 A1 *   8/2005   Curry et al. ................. 382/243
2005/0201624 A1   9/2005   Hara et al.

FOREIGN PATENT DOCUMENTS

JP   2002-288589   4/2002
JP   2004-112346   8/2004

OTHER PUBLICATIONS

Queiroz, Mixed raster content (MRC) model for compound image compression, 1999, SPIE vol. 3653, p. 1106-1117.*
Rabbani, An overview of the JPEG2000 still image compression standard, 2002,Image Communication 17, pp. 3-48.*

* cited by examiner

*Primary Examiner*—Anand Bhatnagar
(74) *Attorney, Agent, or Firm*—Oblon, Spivak, McClelland, Maier & Neustadt, L.L.P.

(57) ABSTRACT

An apparatus, method, system, computer program and product, capable of reducing the size of an original image. The method segments the original image into a first image and a second image, generates a first reduced size image from the first image, which includes a first target pixel having a value obtained using a first method, and generates a second reduced size image from the second image, which includes a second target pixel having a value obtained using a second method.

29 Claims, 15 Drawing Sheets

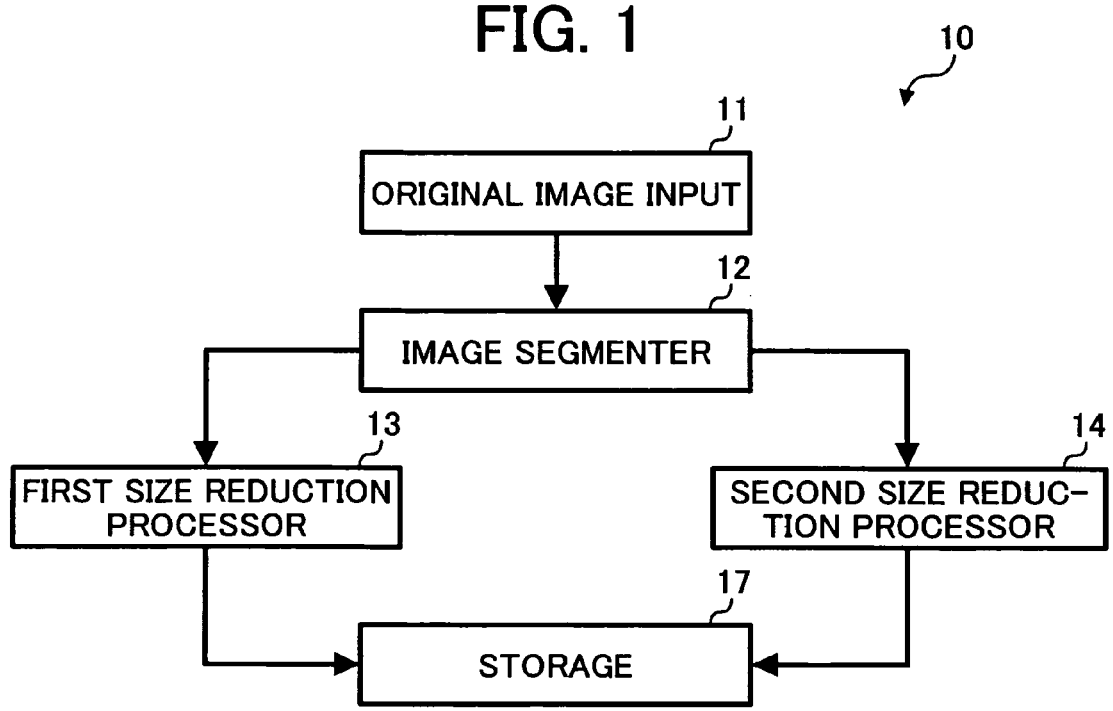
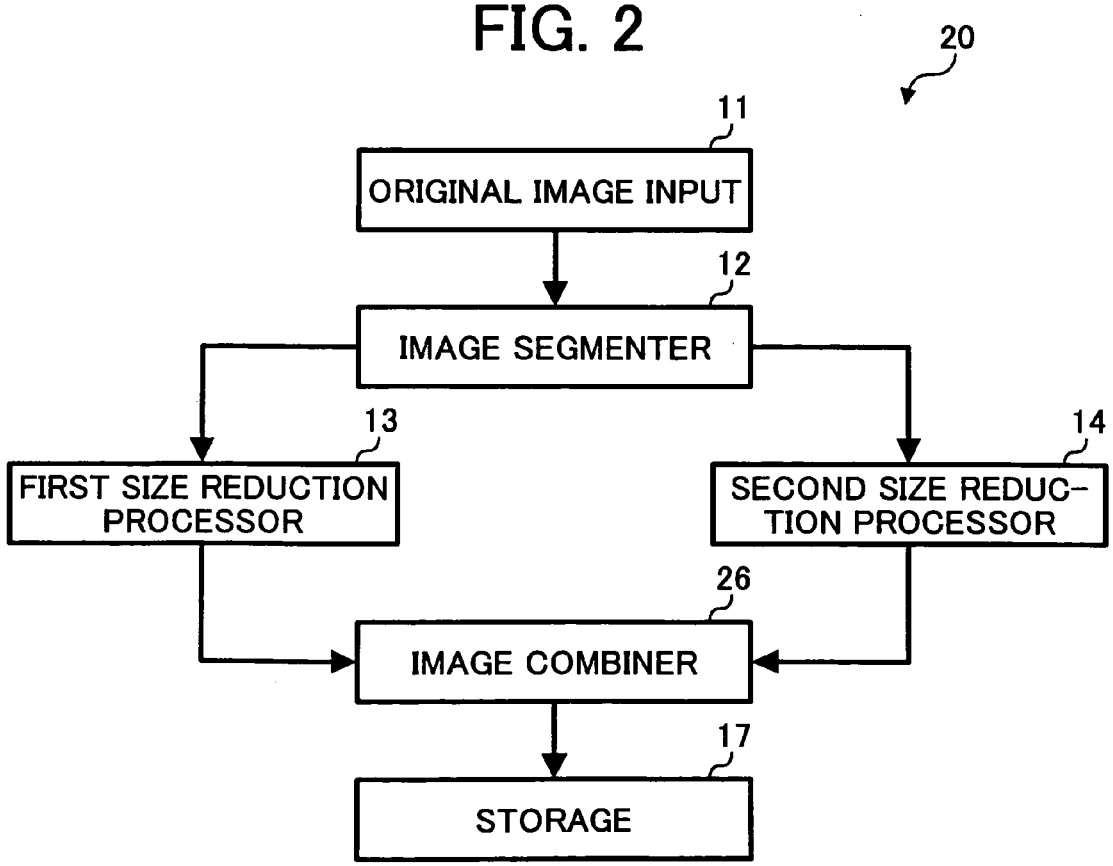

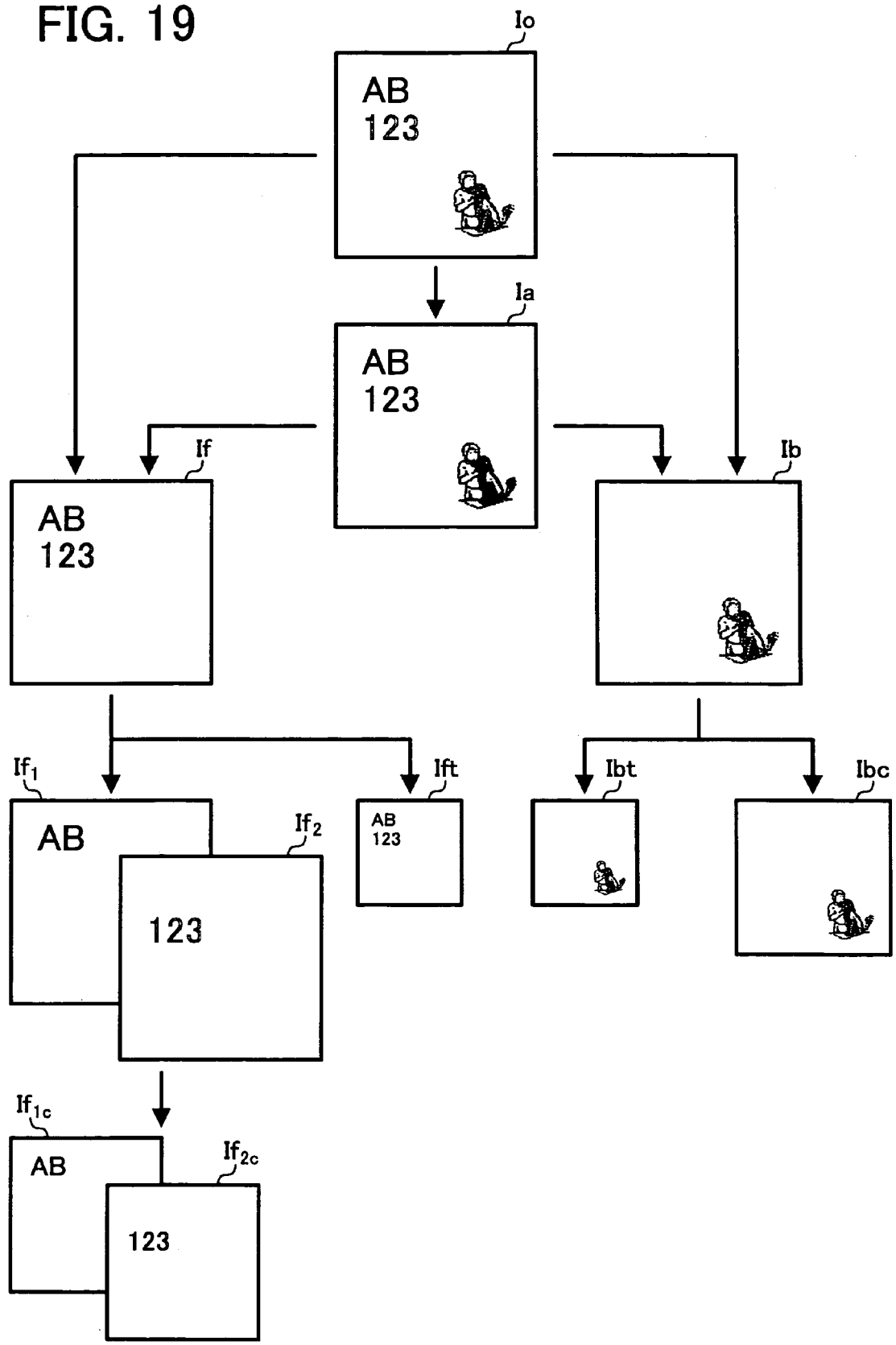

REDUCING THE SIZE OF A DOCUMENT IMAGE

CROSS-REFERENCE TO RELATED APPLICATIONS

This patent application is based on and claims priority to Japanese patent application No. 2005-008348 filed on Jan. 14, 2005, in the Japanese Patent Office, the entire contents of which are hereby incorporated herein by reference.

BACKGROUND OF THE INVENTION

1. Field of the Invention

The field of the invention relates generally to an apparatus, method, system, computer program and product, capable of reducing the size of a document image.

2. Description of the Related Art

Recent image processing apparatuses, such as general-purpose computers, digital cameras, portable communication devices, etc., store a large number of digital images. To assist a user in identifying a particular image, the image processing apparatus may display a reduced size version of the digital image, such as a thumbnail image generated from the digital image. However, quality of the reduced size image may be low, especially when the image contains a character.

SUMMARY OF THE INVENTION

In light of the above-described and other problems, exemplary embodiments of the present invention include an apparatus, method, system, computer program and product, capable of reducing the size of an original image by: segmenting the original image into a first image and a second image; generating a first reduced size image from the first image, which includes a pixel having a value obtained using a first method; and generating a second reduced size image from the second image, which includes a pixel having a value obtained using a second method. It is to be understood that both the foregoing general description of the invention and the following detailed description are exemplary, and are not restrictive of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is a schematic block diagram illustrating the functional structure of an image processing apparatus according to an exemplary embodiment of the present invention;

FIG. 2 is a schematic block diagram illustrating the functional structure of an image processing apparatus according to an exemplary embodiment of the present invention;

FIG. 19 is an illustration for explaining an operation of reducing the size of a document image, performed by the image processing apparatus shown in FIG. 18, according to an exemplary embodiment of the present invention.

DETAILED DESCRIPTION OF THE PREFERRED EMBODIMENTS

Figure 4:
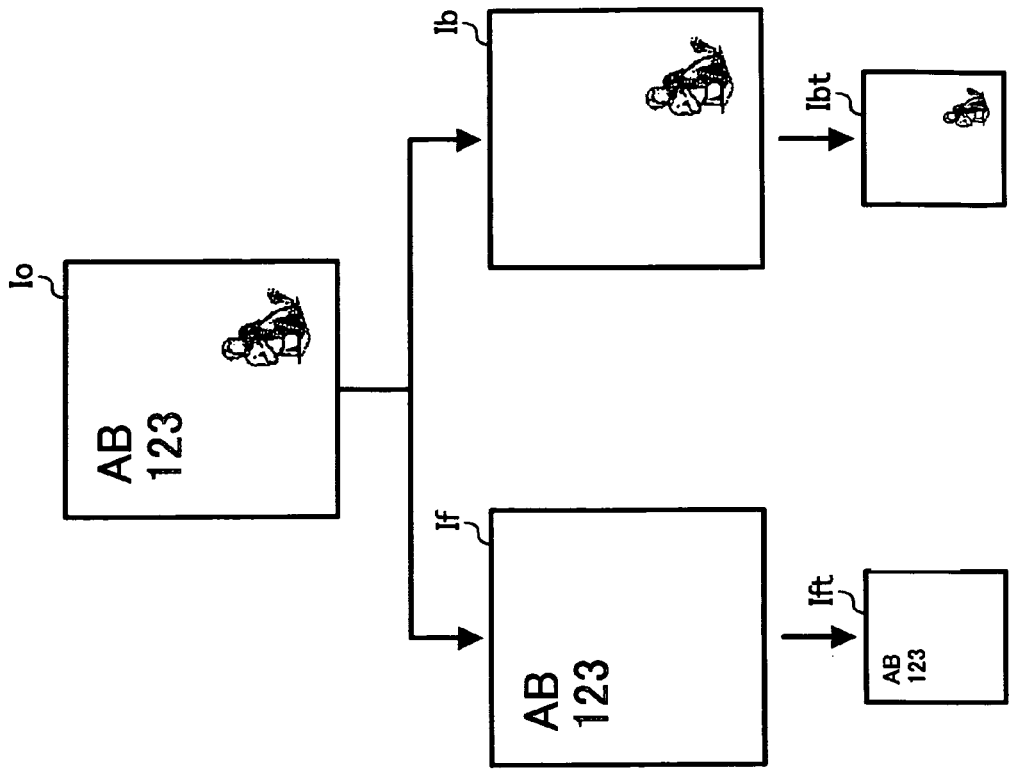
FIG. 4 is an illustration for explaining the operation shown in FIG. 3.

In describing the exemplary embodiments illustrated in the drawings, specific terminology is employed for clarity. However, the disclosure of this patent specification is not intended to be limited to the specific terminology selected and it is to be understood that each specific element includes all technical equivalents that operate in a similar manner.

Referring now to the drawings, wherein like reference numerals designate identical or corresponding parts throughout the several views, FIG. 1 illustrates an image processing apparatus 10 according to an exemplary embodiment of the present invention.

As shown in FIG. 1, the image processing apparatus 10 includes an original image input 11, an image segmenter 12, a first size reduction processor 13, a second size reduction processor 14, and a storage 17.

The original image input 11 inputs an original image to be processed. The original image may be obtained in various ways, for example as a scanned image scanned by a scanner, electronic data read out from a storage device or medium, electronic data received by the image processing apparatus 10 through a network, etc.

The image segmenter 12 segments the original image into a plurality of images according to characteristics of the original image. For example, if the original image contains a foreground section and a background section, the image segmenter 12 segments the original image into a first image corresponding to the foreground section and a second image corresponding to the background section. In this example, the foreground section corresponds to any portion of the original image including a character, numeral, symbol, line, etc., which can be recognized using any kind of image segmentation method. The background section corresponds to any portion of the original image including a picture, etc., or any portion other than the foreground section, which can be recognized using any kind of image segmentation method.

The first size reduction processor 13 generates a first reduced size image from the first image, by reducing the size of the first image. The first size reduction processor 13 reduces the size of the first image by lowering a resolution of the first image. More specifically, the first size reduction processor 13 reduces the size of the first image by reducing a number of pixels contained in the first image.

The second size reduction processor 14 generates a second reduced size image from the second image, by reducing the size of the second image. The second size reduction processor 14 reduces the size of the second image by lowering a resolution of the second image. More specifically, the second size reduction processor 14 reduces the size of the second image by reducing a number of pixels contained in the second image.

The storage 17 stores the first reduced size image and the second reduced size image in a corresponding manner. In addition to the first and second reduced size images, the storage 17 may store the original image input by the original image input 11 in a corresponding manner with the first and second reduced size images. Further, the first and second reduced size images may be combined together for display.

Referring now to FIG. 2, an image processing apparatus 20 is explained according to an exemplary embodiment of the present invention. The image processing apparatus 20 of FIG. 2 is substantially similar in functional structure to the image processing apparatus 10 of FIG. 1. The differences include the addition of an image combiner 26.

The image combiner 26 combines the first reduced size image and the second reduced size image into a reduced size image. The storage 17 stores the reduced size image. The reduced size image may be displayed by any kind of display device.

Figure 3:
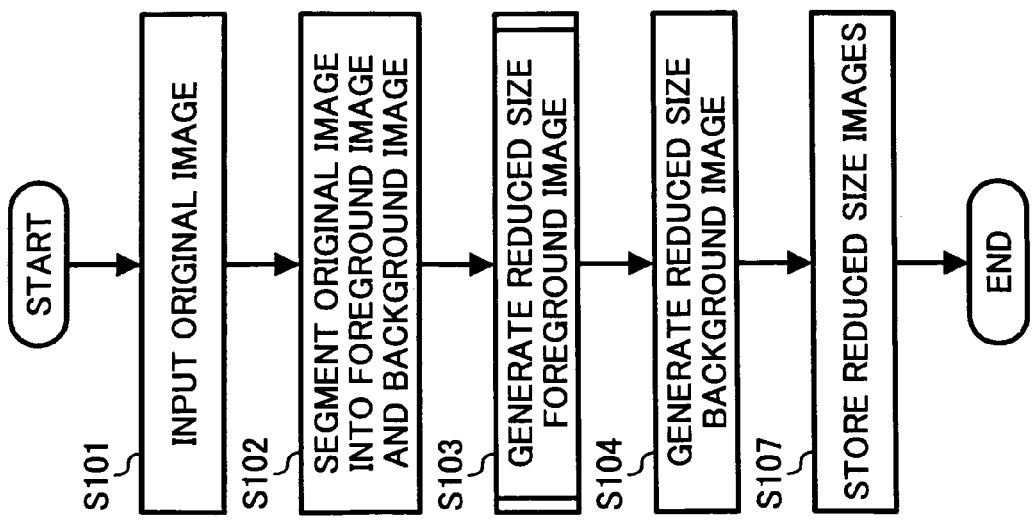
FIG. 3 is a flowchart illustrating an operation of reducing the size of a document image according to an exemplary embodiment of the present invention.

Referring now to FIGS. 3 and 4, an operation of reducing the size of an original image is explained according to an exemplary embodiment of the present invention. The steps illustrated in FIG. 3 may be performed by the image processing apparatus 10 or 20, or any kind of image processing system capable of functioning as the image processing apparatus 10 or 20.

Figure 5:
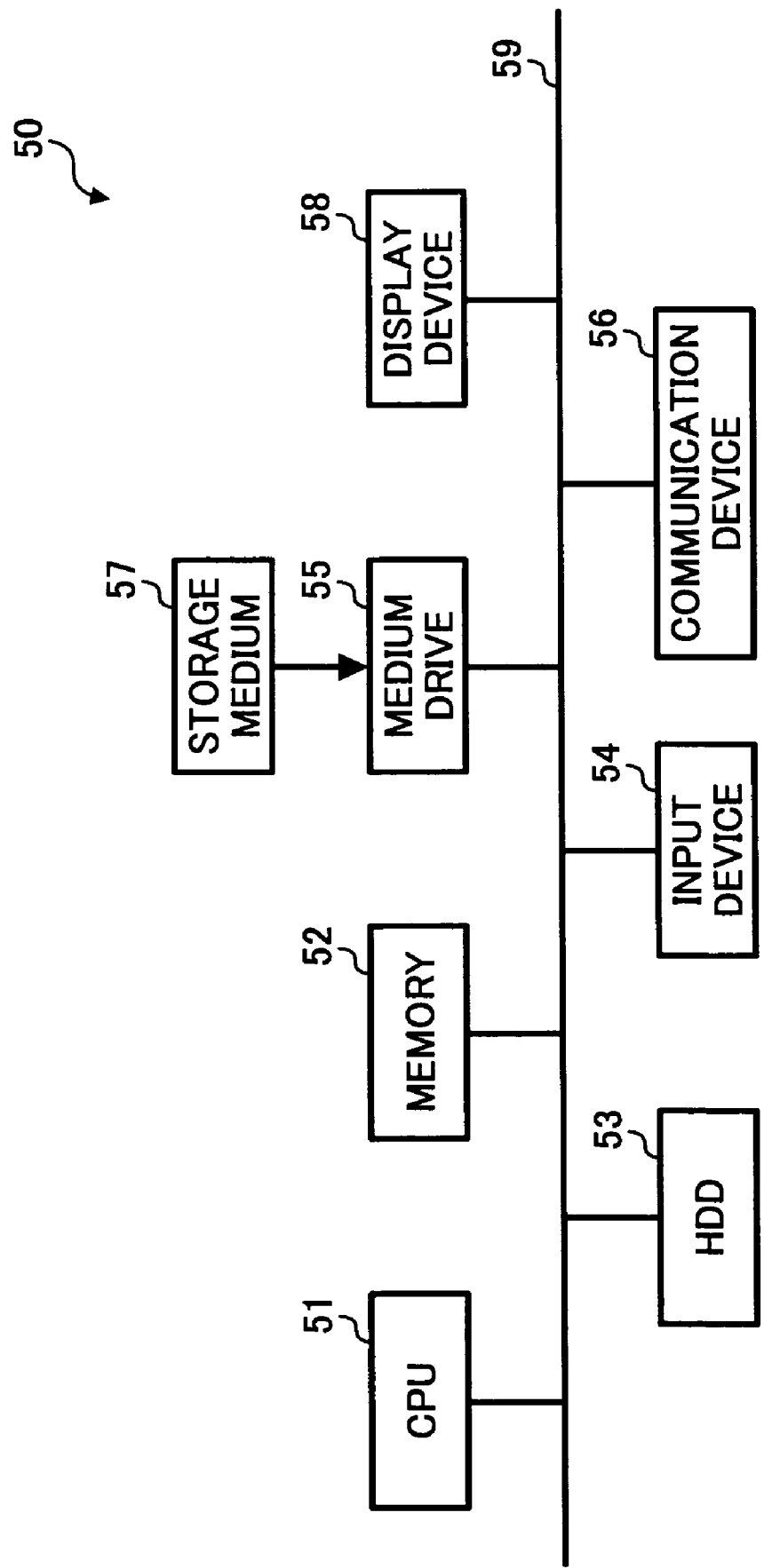
FIG. 5 is a schematic block diagram illustrating the hardware structure of an image processing apparatus according to an exemplary embodiment of the present invention.

In one example, the steps illustrated in FIG. 3 may be performed by a personal computer (PC) 50 shown in FIG. 5. As shown in FIG. 5, the PC 50 includes a central processing unit (CPU) 51, a memory 52, a hard disk drive (HDD) 53, an input device 54, a medium drive 55, a communication device 56, a storage medium 57, and a display device 58, which are connected via a bus 59.

The CPU 51 includes any kind of processor capable of controlling operation of the PC 50. The memory 52 includes any kind of involatile or volatile memory, which may be used by the CPU 51. The HDD 53 includes any kind of device capable of storing various data.

The input device 54 includes any kind of device capable of inputting data, such as a keyboard or a mouse, for example. The display device 58 includes any kind of device capable of displaying, such as a liquid crystal display (LCD), for example. The communication device 56 includes any kind of device capable of connecting the PC 50 to a network, such as a LAN or the Internet, for example.

The medium drive 55 includes any kind of device capable of reading data from the storage medium 57. Examples of the storage medium 57 include, but are not limited to, optical discs such as CD-ROM, CD-R, CD-RW, DVD-ROM, DVD-RAM, DVD-R, DVD+R, DVD-RW and DVD+RW, magneto optical discs, memory cards, and flexible disks.

In one exemplary operation, an image processing program of the present invention is read out from the storage medium 57 onto the HDD 53. The image processing program may be further loaded onto the memory 52 upon activation of the CPU 51 to cause the PC 50 to operate according to the image processing program.

In another exemplary operation, the image processing program is downloaded from any other device or apparatus via the network, through the communication device 56, onto the HDD 53. The image processing program may be further loaded onto the memory 52 upon activation of the CPU 51 to cause the PC 50 to operate according to the image processing program. Further, the image processing program may be uploaded from the PC 50 to any other device or apparatus through the network.

Figure 6:
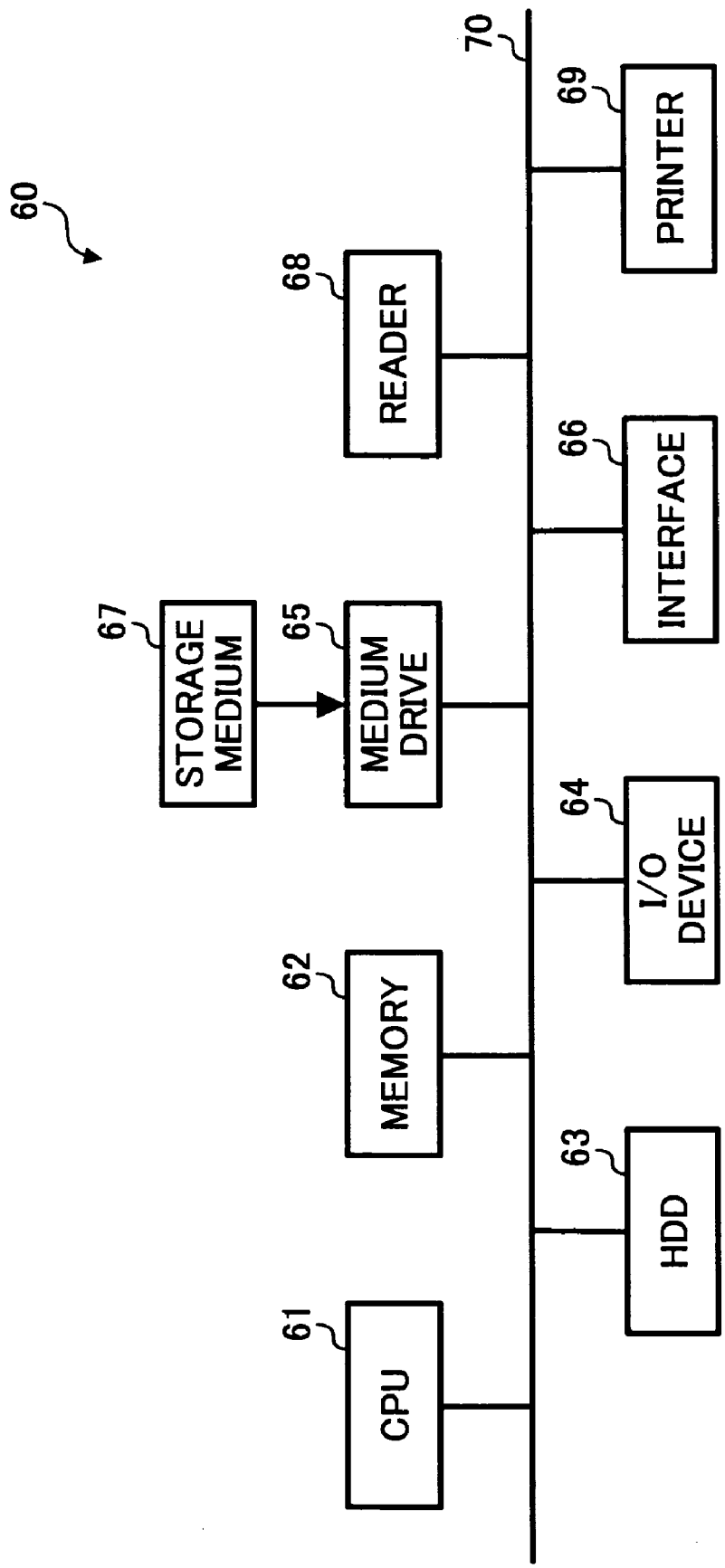
FIG. 6 is a schematic block diagram illustrating the hardware structure of an image processing apparatus according to an exemplary embodiment of the present invention.

Alternatively, the steps illustrated in FIG. 3 may be performed by a multifunctional apparatus (MFP) 60 shown in FIG. 6. As shown in FIG. 6, the MFP 60 includes a CPU 61, a memory 62, a HDD 63, an input/display (I/O) device 64, a medium drive 65, an interface 66, a storage medium 67, a reader 68, and a printer 69, which are connected via a bus 70.

The CPU 61 includes any kind of processor capable of controlling operation of the MFP 60. The memory 62 includes any kind of involatile or volatile memory, which may be used by the CPU 61. The HDD 63 includes any kind of device capable of storing various data.

The I/O device 64 includes any kind of device capable of inputting data or outputting data, such as an operation panel including a display, keyboard, button, etc. The interface 66 includes any kind of device capable of connecting the MFP 60 to a network, such as a LAN or the Internet, for example.

The medium drive 65 includes any kind of device capable of reading data from the storage medium 67. Examples of the storage medium 67 include, but are not limited to, optical discs such as CD-ROM, CD-R, CD-RW, DVD-ROM, DVD-RAM, DVD-R, DVD+R, DVD-RW and DVD+RW, magneto optical discs, memory cards, and flexible disks.

The reader 68 includes any kind of device capable of reading an original image into electronic data, such as a scanner, for example. The printer 69 includes any kind of device capable of printing electronic data as a printed image, such as a printer, for example.

In one exemplary operation, an image processing program of the present invention is read out from the storage medium 67 onto the HDD 63. The image processing program may be further loaded onto the memory 62 upon activation of the CPU 61 to cause the MFP 60 to operate according to the image processing program.

In another exemplary operation, the image processing program is downloaded from any other device or apparatus via the network, through the interface 66, onto the HDD 63. Further, the image processing program may be uploaded from the MFP 60 to any other device or apparatus through the network.

Referring back to FIG. 3, Step S101 inputs an original image to be processed. In this example, a document image, such as an original document image Io ("the original image Io") shown in FIG. 4, is obtained. The original image Io of FIG. 4 contains a foreground section having a plurality of characters (indicated by "AB" in FIG. 4) and a plurality of numerals (indicated by "123" in FIG. 4). The portion other than the foreground section is referred to as a background section. As shown in FIG. 4, the background section of the original image Io may include a picture.

Step S102 segments the original image Io into a foreground image If and a background image Ib, using any kind of image segmentation method. As shown in FIG. 4, the foreground image If corresponds to the foreground section of the original image Io, while the background image Ib corresponds to the background section of the original image Io.

Step S103 generates a reduced size foreground image Ift from the foreground image If. As shown in FIG. 4, the size of the reduced size foreground image Ift is smaller than the size of the foreground image If. More specifically, the number of pixels contained in the reduced size foreground image Ift is less than the number of pixels contained in the foreground image If. Further, in this example, the values of the pixels in the reduced size foreground image Ift are determined using a method suitable to the characteristics of the foreground image If, for example, as described below referring to FIG. 9 or 11.

Step S104 generates a reduced size background image Ibt from the background image Ib. As shown in FIG. 4, the size of the reduced size background image Ibt is smaller than the size of the background image Ib. More specifically, the number of pixels contained in the reduced size background image Ibt is less than the number of pixels contained in the foreground image Ib. Further, in this example, the values of the pixels in the reduced size background image Ibt are determined using a method suitable to the characteristics of the background image Ib.

Step S107 stores the reduced size foreground image Ift and the reduced size background image Ibt. In this step, the original image Io may be additionally stored in a corresponding manner with the reduced size foreground image Ift and the reduced size background image Ibt.

The operation of FIG. 3 may be performed in various ways. For example, Steps S103 and S104 may be performed in different orders.

Figure 7:
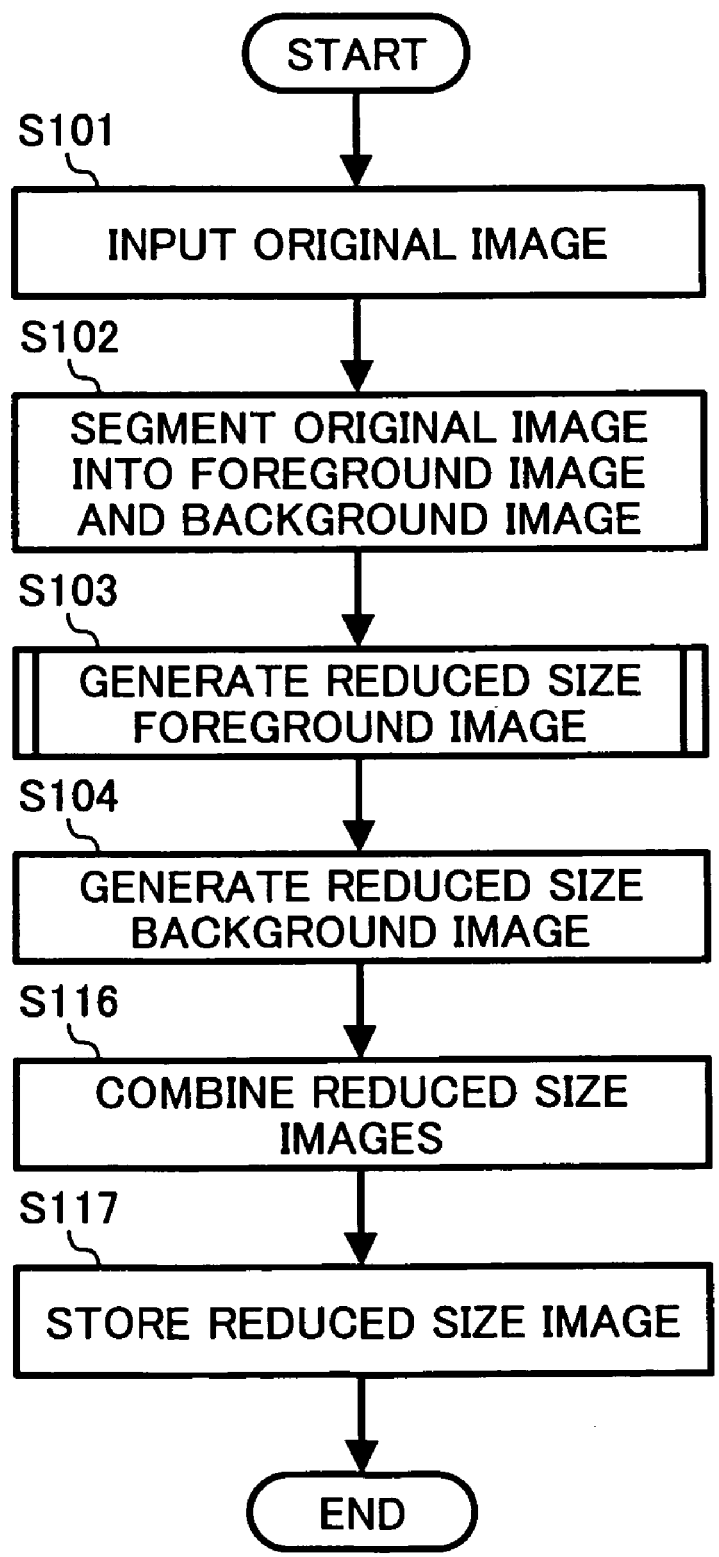
FIG. 7 is a flowchart illustrating an operation of reducing the size of a document image according to an exemplary embodiment of the present invention.
Figure 8:
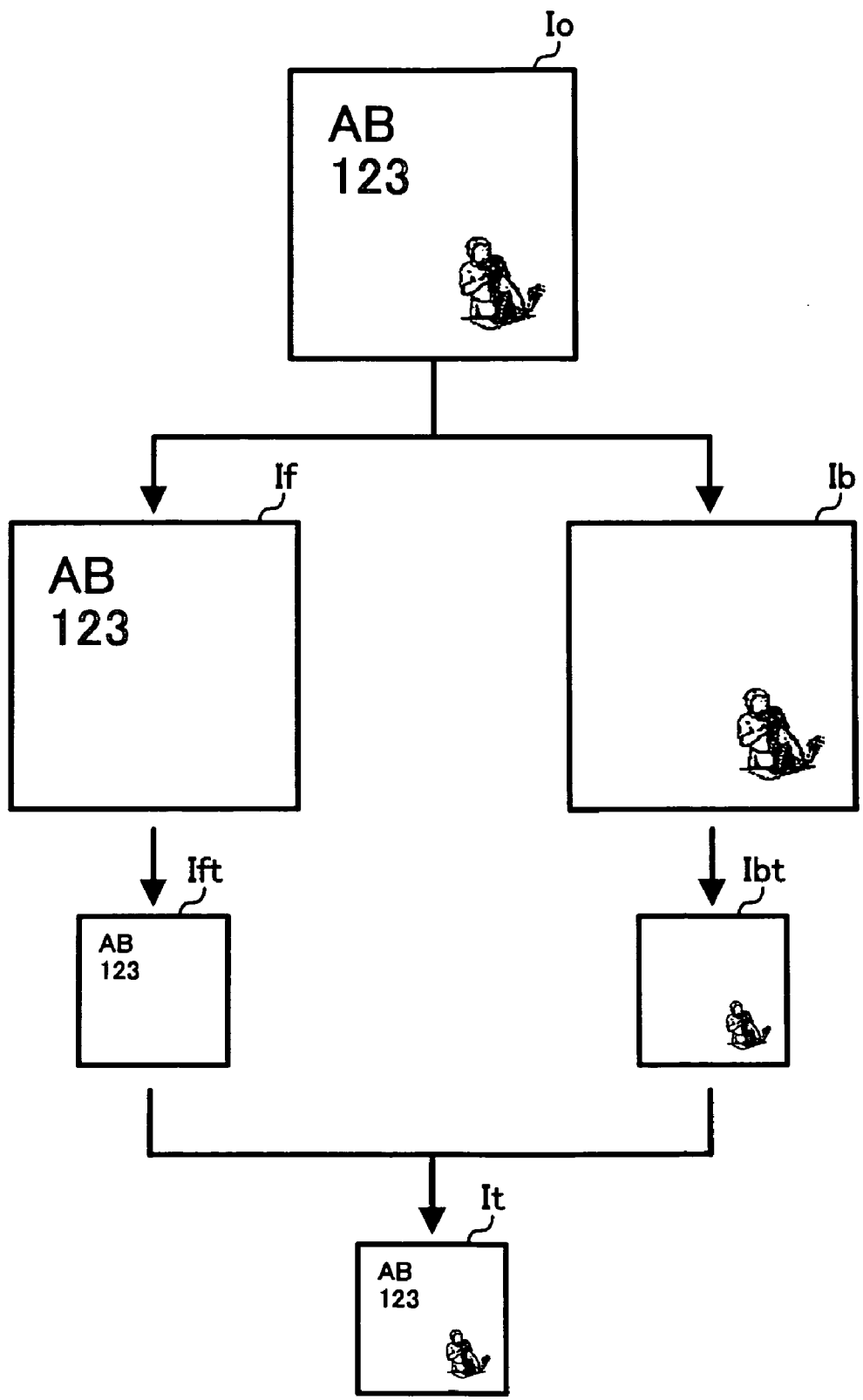
FIG. 8 is an illustration for explaining the operation shown in FIG. 7.

Referring now to FIGS. 7 and 8, an operation of reducing the size of an original image is explained according to an exemplary embodiment of the present invention. The operation shown in FIG. 7 is substantially similar to the operation shown in FIG. 3, except for the addition of Step S116, and the replacement of Step S107 with Step S117. Further, the steps illustrated in FIG. 7 may be performed by the image processing apparatus 20 of FIG. 2, or any kind of image processing system capable of functioning as the image processing apparatus 20, which may have the structure shown in FIG. 5 or 6.

Referring to FIGS. 7 and 8, Step S101 inputs an original image Io having a foreground section and a background section. Step S102 segments the original image Io into a foreground image If and a background image Ib. Step S103 reduces the size of the foreground image If using a method suitable to the characteristics of the foreground image If to generate a reduced size foreground image Ift. Step S104 reduces the size of the background image Ib using a method suitable to the characteristics of the background image Ib to generate a reduced size background image Ibt.

Step S116 combines the reduced size foreground image Ift and the reduced size background image Ibt into a reduced size image It. As shown in FIG. 8, the size of the reduced size image It is smaller than the size of the original image Io. More specifically, the number of pixels contained in the reduced size image It is less than the number of pixels contained in the original image Io.

Step S117 stores the reduced size image It. In this step, the original image Io may be additionally stored in a corresponding manner with the reduced size image It. The reduced size image It may be displayed, using any kind of display device, such as the display device 58 of FIG. 5 or the I/O device 64 of FIG. 6.

As described above in any one of FIGS. 3 and 7, Step S103 of generating a reduced size foreground image is performed using a method suitable to the characteristics of the foreground image If. Further, Step S104 of generating a reduced size background image is performed using a method suitable to the characteristics of the background image Ib. In this manner, the quality of the reduced size image may be kept high, without suppressing the processing speed.

Figure 9:
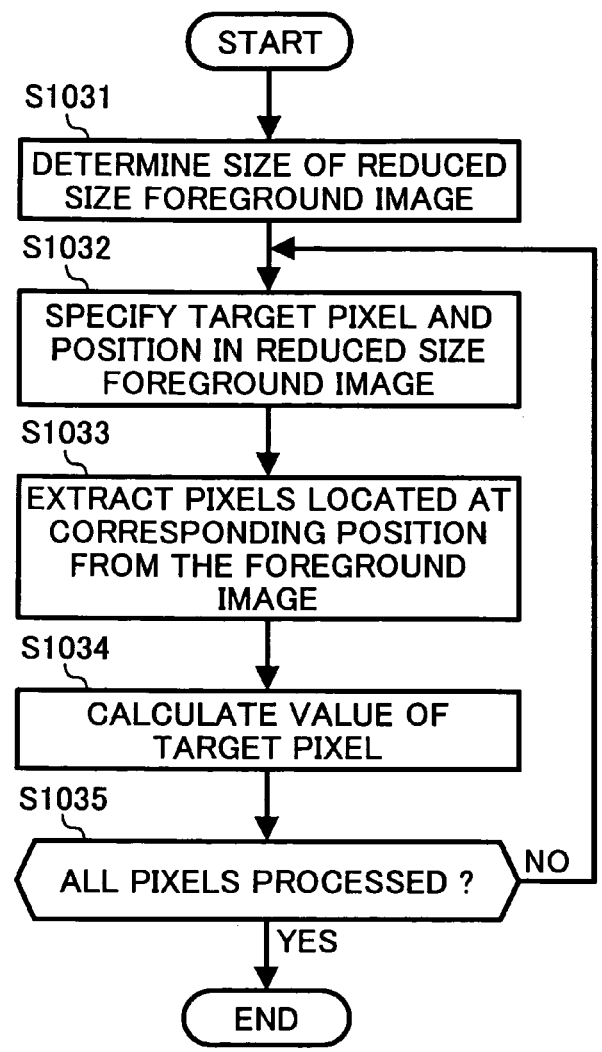
FIG. 9 is a flowchart illustrating an operation of determining a pixel value of a first reduced size image according to an exemplary embodiment of the present invention.

Referring now to FIG. 9, an operation of determining a pixel value of the reduced size foreground image Ift, which may be performed in Step S103 of FIG. 3 or 7, is explained according to an exemplary embodiment of the present invention. The steps shown in FIG. 9 are performed by the first size reduction processor 13 or any element operating as the first size reduction processor 13.

Figure 10:
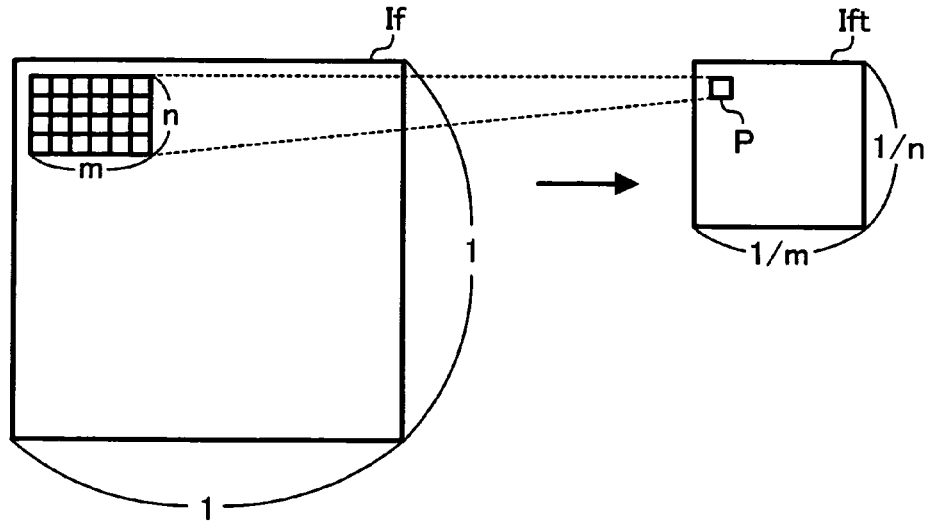
FIG. 10 is an illustration for explaining an operation of determining a pixel value of a first reduced size image according to an exemplary embodiment of the present invention.

Step S1031 determines the size of the reduced size foreground image Ift. The size of the reduced size foreground image Ift may be set by default, or it may be set according to a user's preference. For example, as illustrated in FIG. 10, the size of the reduced size foreground image Ift may be set to 1/m*n relative to the size of the foreground image If. In this example, the size of the foreground image If is set to be equal to the size of the original image Io.

Step S1032 specifies a target pixel P and its position in the reduced size foreground image Ift.

Step S1033 specifies a position in the foreground image If, which corresponds to the position of the target pixel P of the reduced size foreground image Ift. Once the position is specified, a plurality of pixels located at the specified position of the foreground image If is extracted.

Step S1034 calculates the value of the target pixel P of the reduced size foreground image Ift, using the values of the plurality of pixels extracted from the foreground image If. In this step, the value of the target pixel P is calculated using a method suitable to the characteristics of the foreground image If.

In one example, the first size reduction processor 13 averages the values of the plurality of pixels extracted from the foreground image If to obtain an average value. The average value is then used as the value of the target pixel P.

In another example, the first size reduction processor 13 may obtain a lowest value from the values of the plurality of pixels located in the corresponding position of the foreground image If. The lowest value is then used as the value of the target pixel P. For example, the first size reduction processor 13 may determine whether the foreground image If contains pixels with relatively dark colors, such as black, by comparing the average value of the plurality of pixels with a threshold value. When the average value is lower than the threshold value, the first size reduction processor 13 determines that the foreground image If contains pixels with dark colors, and obtains the lowest value from the values of the plurality of pixels in the foreground image If.

In another example, the first size reduction processor 13 may obtain a highest value from the values of the plurality of pixels located in the corresponding position of the foreground image If. The highest value is then used as the value of the target pixel P. For example, the first size reduction processor 13 may determine whether the foreground image If contains pixels with relatively light colors, such as white, by comparing the average value of the plurality of pixels with the threshold value. When the average value is higher than the threshold value, the first size reduction processor 13 determines that the foreground image If contains pixels with light colors, and obtains the highest value from the values of the plurality of pixels in the foreground image If.

In another example, the first size reduction processor 13 may select one of the values of the plurality of pixels located in the corresponding position of the foreground image If, based on the values of the plurality of pixels of the foreground image If. For example, the first size reduction processor 13 may obtain the average value of the plurality of pixels, and compare the average value with a threshold value. If the average value is lower than the threshold value, the first size reduction processor 13 obtains a lowest value from the value of the plurality of pixels in the foreground image If. If the average value is higher than the threshold value, the first size reduction processor 13 obtains a highest value from the values of the plurality of pixels in the foreground image If.

Referring back to FIG. 9, Step S1035 determines whether all pixels in the reduced size foreground image Ift have been processed. If all pixels have been processed ("YES" in Step S1035), the operation ends. Otherwise ("NO" in Step S1035), the operation returns to Step S1032 to process another pixel.

The operation of determining a pixel value of the reduced size background image Ibt, which may be performed in Step S104 of FIG. 3 or 7, may be performed in a manner similar to the manner described above referring to FIG. 9. However, the steps illustrated in FIG. 9 are performed by the second size reduction processor 14. Further, Step S1034 of calculating the value of the target pixel P is performed using a method suitable to the characteristics of the background image Ib.

In one example, the second size reduction processor 14 averages the values of a plurality of pixels extracted from the background image Ib to obtain an average value. The average value is then used as the value of the target pixel P.

In another example, the second size reduction processor 14 selects one of the values of the plurality of pixels extracted from the background image Ib. The selected value is then used as the value of the target pixel P.

For example, the selected value may correspond to the value of one of the plurality of pixels, which is located at a predetermined position in the background image Ib. In another example, the selected value may be randomly selected from the values of the plurality of pixels extracted from the background image Ib. In another example, the selected value may correspond to the value of at least one of the plurality of pixels, which has a highest frequency rate.

Figure 11:
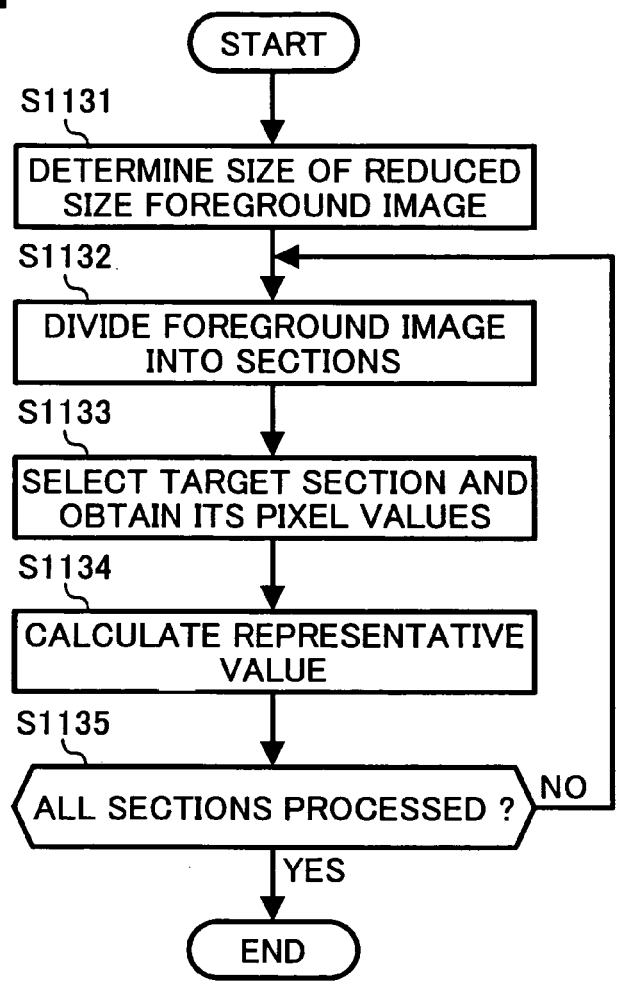
FIG. 11 is a flowchart illustrating an operation of determining a pixel value of a first reduced size image according to an exemplary embodiment of the present invention.
Figure 12:
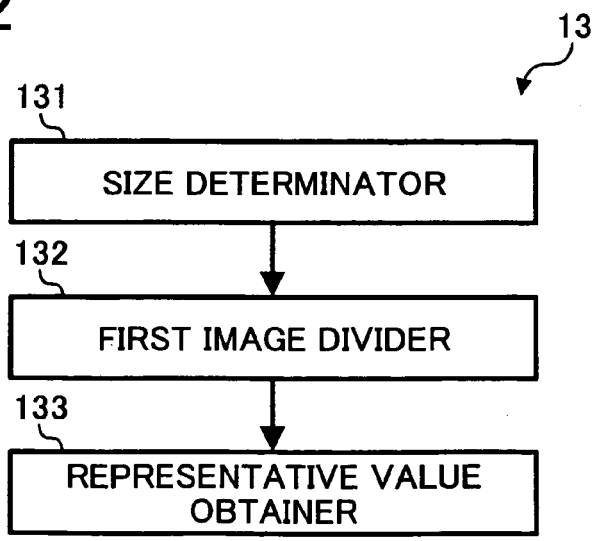
FIG. 12 is a schematic block diagram illustrating the functional structure of a first size reduction processor shown in FIG. 1 or 2.

Referring now to FIG. 11, an operation of determining a pixel value of the reduced size foreground image Ift, which may be performed in Step S103 of FIG. 3 or 7, is explained according to an exemplary embodiment of the present invention. The steps shown in FIG. 11 are performed by the first size reduction processor 13. Specifically, in this example, the first size reduction processor 13 includes a size determinator 131, a first image divider 132, and a representative value obtainer 133, as illustrated in FIG. 12.

The size determinator 131 determines the size of the reduced size foreground image. The first image divider 132 divides the foreground image into a plurality of sections according to the size of the reduced size foreground image. The representative value obtainer 133 obtains a representative value for each of the plurality of sections, using a plurality of pixel values contained in each of the plurality of sections.

Figure 13:
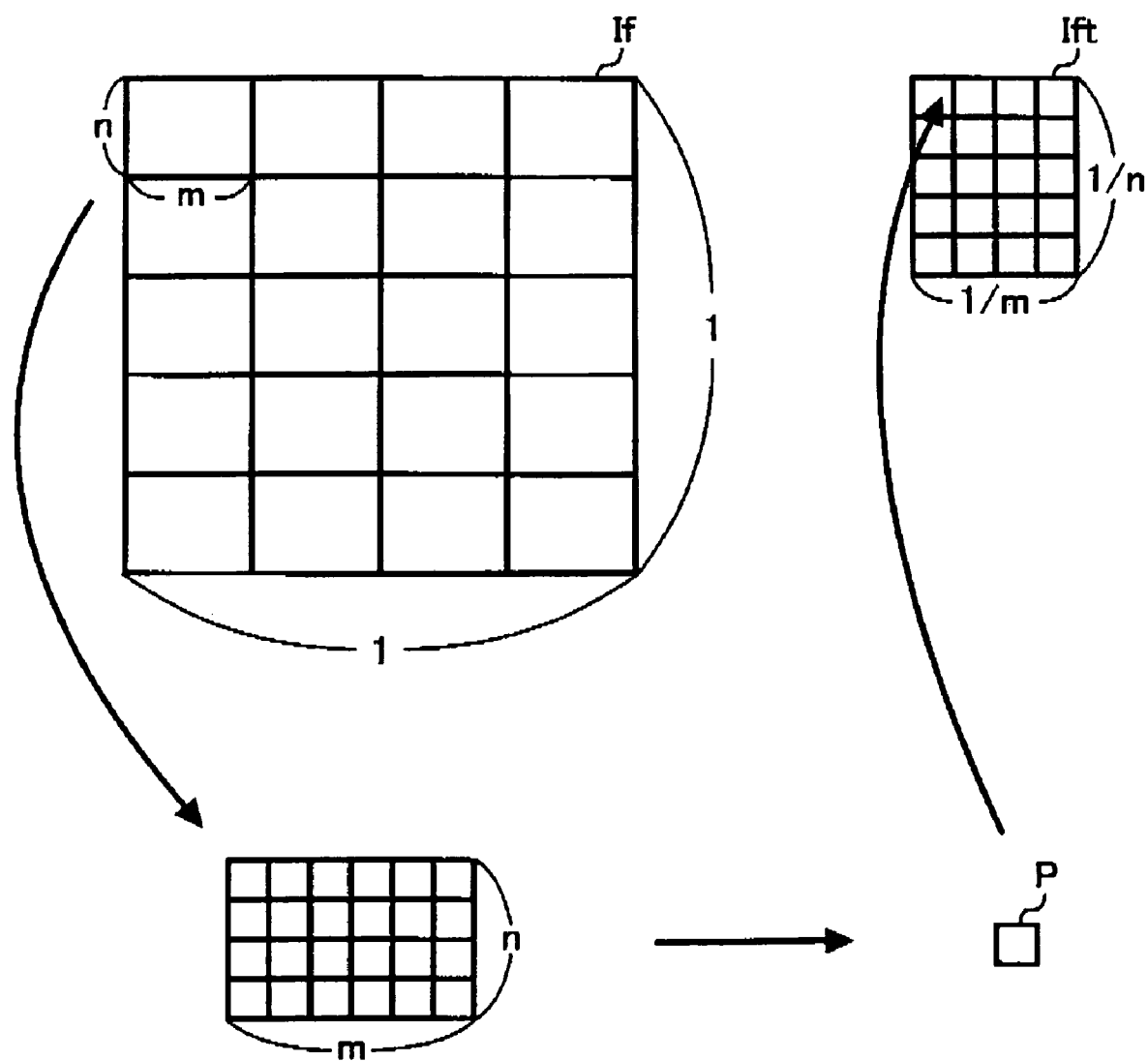
FIG. 13 is an illustration for explaining an operation of determining a pixel value of a first reduced size image according to an exemplary embodiment of the present invention.

Referring back to FIG. 11, Step S1131 determines the size of the reduced size foreground image Ift. The size of the reduced size foreground image Ift may be set by default, or it may be set according to a user's preference. For example, as illustrated in FIG. 13, the size of the reduced size foreground image Ift may be set to 1/m*n relative to the size of the foreground image If. In this example, the size of the foreground image If is set to be equal to the size of the original image Io. Step S1131 may be performed by the size determinator 131.

Step S1132 divides the foreground image If into a plurality of sections. The dimension of each section is determined corresponding to the size of the reduced size foreground image Ift. In the exemplary case shown in FIG. 13, the section of the foreground image If has the dimension of m*n. Step S1132 may be performed by the first image divider 132.

Step S1133 selects a target section from the foreground image If, for example, in the order from the upper left to the bottom right of the foreground image If. At the same time, a plurality of the pixels contained in the target section are obtained. Step S1133 may be performed by the first image divider 132.

Step S1134 calculates a representative value, which represents the target section, using the values of the plurality of the pixels contained in the target section. In this step, the representative value is calculated using a method suitable to the characteristics of the foreground image If.

In one example, the representative value obtainer 133 averages the values of the plurality of the pixels in the target section to obtain an average value. The average value is then used as the representative value.

In another example, the representative value obtainer 133 may obtain a lowest value from the values of the plurality of the pixels in the target section. The lowest value is then used as the representative value. For example, the first size reduction processor 13 may obtain the average value of the plurality of the pixels contained in the target section to compare it with a threshold value. When the average value is lower than the threshold value, the lowest value is used as the representative value.

In another example, the representative value obtainer 133 may obtain a highest value from the values of the plurality of the pixels in the target section. The highest value is then used as the representative value. For example, the first size reduction processor 13 may obtain the average value of the plurality of the pixels contained in the target section to compare it with a threshold value. When the average value is higher than the threshold value, the highest value is used as the representative value.

In another example, the representative value obtainer 133 may select one of the values of the plurality of the pixels in the target section, based on the values of the plurality of pixels. For example, the first size reduction processor 13 may obtain the average value of the plurality of the pixels contained in the target section to compare it with a threshold value. If the average value is lower than the threshold value, a lowest value is extracted from the values of the plurality of pixels as the representative value. If the average value is higher than the threshold value, a highest value is extracted from the values of the plurality of pixels as the representative value.

Step S1135 determines whether all sections in the foreground image If have been processed. If all sections have been processed ("YES" in Step S1135), the operation ends. Otherwise ("NO" in Step S1135), the operation returns to Step S1132 to process another section.

The operation of determining a pixel value of the reduced size background image Ibt, which may be performed in Step S104 of FIG. 3 or 7, may be performed in a manner similar to the manner described above referring to FIG. 11. However, the steps illustrated in FIG. 11 are performed by the second size reduction processor 14, which has a structure similar to the structure shown in FIG. 12. Further, Step S1134 of calculating the representative value is performed using a method suitable to the characteristics of the background image Ib.

In one example, the second size reduction processor 14 averages the values of the plurality of the pixels in the target section to obtain an average value. The average value is then used as the representative value.

In another example, the second size reduction processor 14 selects one of the values of the plurality of the pixels in the target section. The selected value is then used as the representative value.

In one example, the selected value may correspond to the value of one of the plurality of pixels, which is located at a predetermined position in the target section. For example, if the predetermined position is set to be the upper left position in the target section, the value of the pixel located at the upper left position is used as the representative value.

In another example, the selected value may be randomly selected from the values of the plurality of the pixels contained in the target section.

In another example, the selected value may correspond to the value of at least one of the plurality of pixels, which has a highest frequency rate. For example, if a majority of the plurality of the pixels in the target section have the pixel values of 255, the value 255 is used as the representative value.

As mentioned above, the reduced size image generated by any one of the image processing apparatuses of the present invention may be displayed using any kind of display device, which may be incorporated in any kind of apparatus such as a personal computer, communication device including a portable phone, image forming apparatus, etc. In one exemplary operation, the image processing apparatus may receive a request from a user for displaying a list of original images stored in the image processing apparatus.

Upon receiving the request for displaying, in one example, the image processing apparatus may display the reduced size images, which are stored in a corresponding manner with the original images. The user may select one of the reduced size images to obtain the corresponding original image.

Upon receiving the request for displaying, in another example, the image processing apparatus may display the reduced size images, which are stored in a corresponding manner with compressed images, which are generated by compressing the original images. The user may select one of the reduced size images to obtain the corresponding compressed image.

Figure 14:
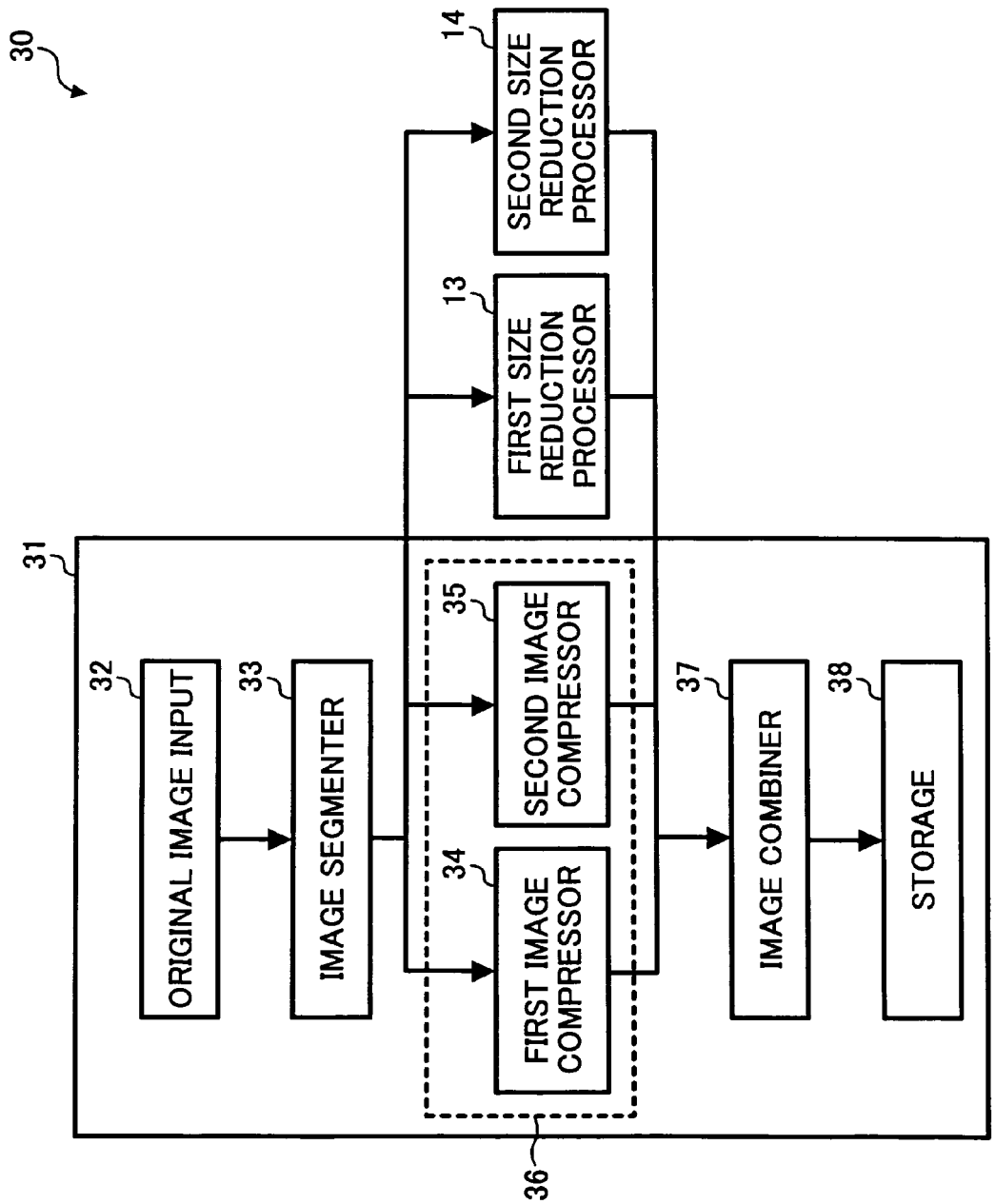
FIG. 14 is a schematic block diagram illustrating the functional structure of an image processing apparatus according to an exemplary embodiment of the present invention.

Referring now to FIG. 14, an image processing apparatus 30 is explained according to an exemplary embodiment of the present invention. The image processing apparatus 30 generates a compressed image and a reduced size image, respectively, from an original image.

As shown in FIG. 14, the image processing apparatus 30 includes an image compressing device 31, the first size reduction processor 13, and the second size reduction processor 14. The image compressing device 31 may be implemented by any kind of image compressing device capable of applying different compression methods to different sections of the original image. Specifically, in this example, the image compressing device 31 includes an original image input 32, an image segmenter 33, a first image compressor 34, a second image compressor 35, an image combiner 37, and a storage 38.

The original image input 32 inputs an original image to be processed.

Figure 16:
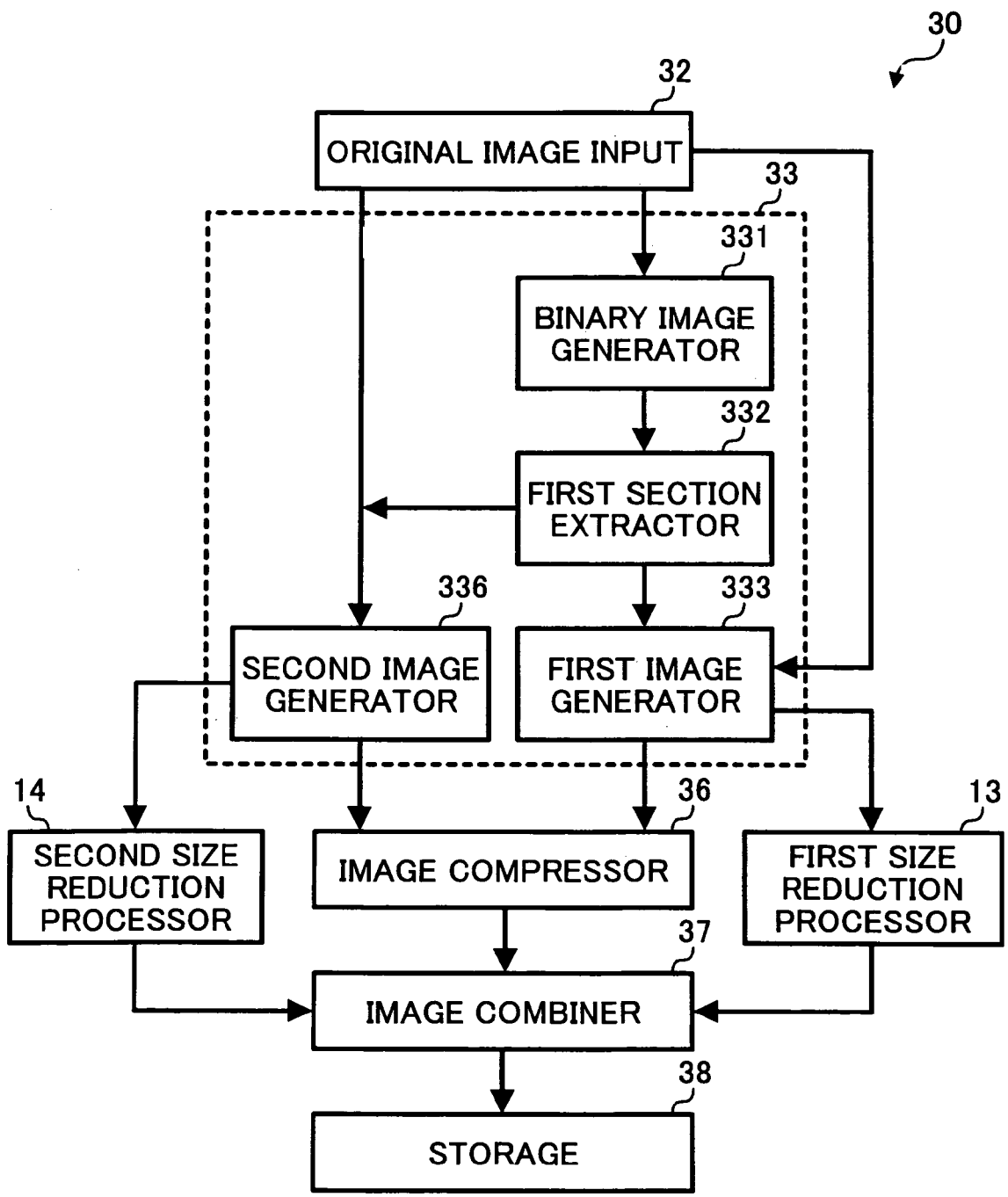
FIG. 16 is a schematic block diagram illustrating the functional structure of an image processing apparatus according to an exemplary embodiment of the present invention.
Figure 18:
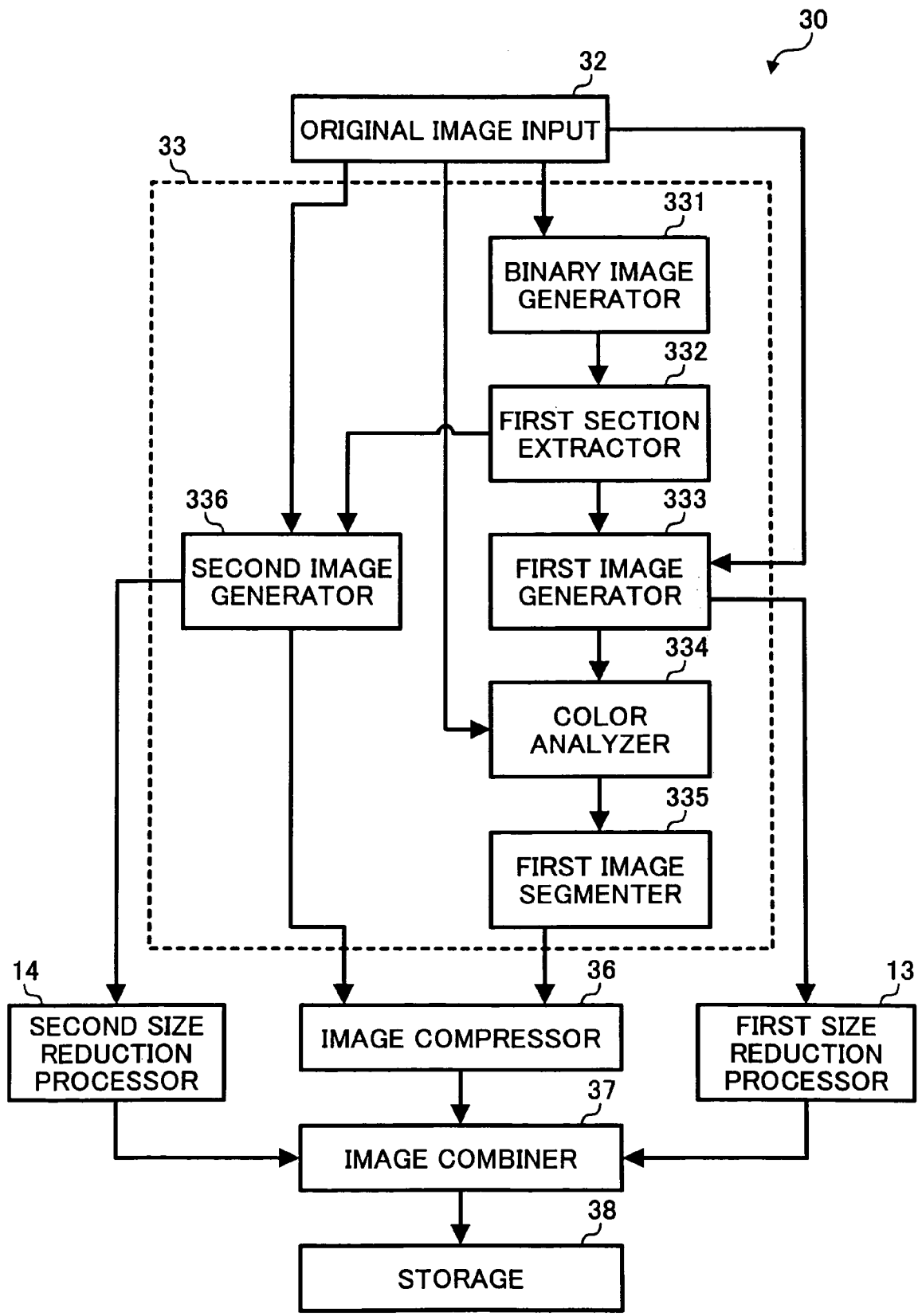
FIG. 18 is a schematic block diagram illustrating the functional structure of an image processing apparatus according to an exemplary embodiment of the present invention.

The image segmenter 33 segments the original image into a plurality of images according to characteristics of the original image. For example, if the original image contains a foreground section and a background section, the image segmenter 33 segments the original image into a first image corresponding to the foreground section and a second image corresponding to the background section. As illustrated in FIG. 16 or 18, the image segmenter 33 may be implemented in various ways.

The first size reduction processor 13 reduces the size of the first image using a method suitable to the characteristics of the first image to generate a first reduced size image.

The second size reduction processor 14 reduces the size of the second image using a method suitable to the characteristics of the second image to generate a second reduced size image.

The first image compressor 34 compresses the first image using a compression method suitable to the characteristics of the first image to generate a first compressed image. The second image compressor 35 compresses the second image using a compression method suitable to the characteristics of the second image to generate a second compressed image. The first image compressor 34 and the second image compressor 35 may be incorporated into one element as an image compressor 36, as illustrated in FIG. 14.

The image combiner 37 combines a plurality of images into one image. For example, the image combiner 37 combines the first compressed image and the second compressed image into a compressed image. In another example, the image combiner 37 combines the first reduced size image and the second reduced size image into a reduced size image.

The storage 38 stores one or more images. For example, the storage 38 stores the compressed image and the reduced size image in a corresponding manner. Further, the storage 38 may store the original image in a corresponding manner with the compressed image and the reduced size image.

Figure 15:
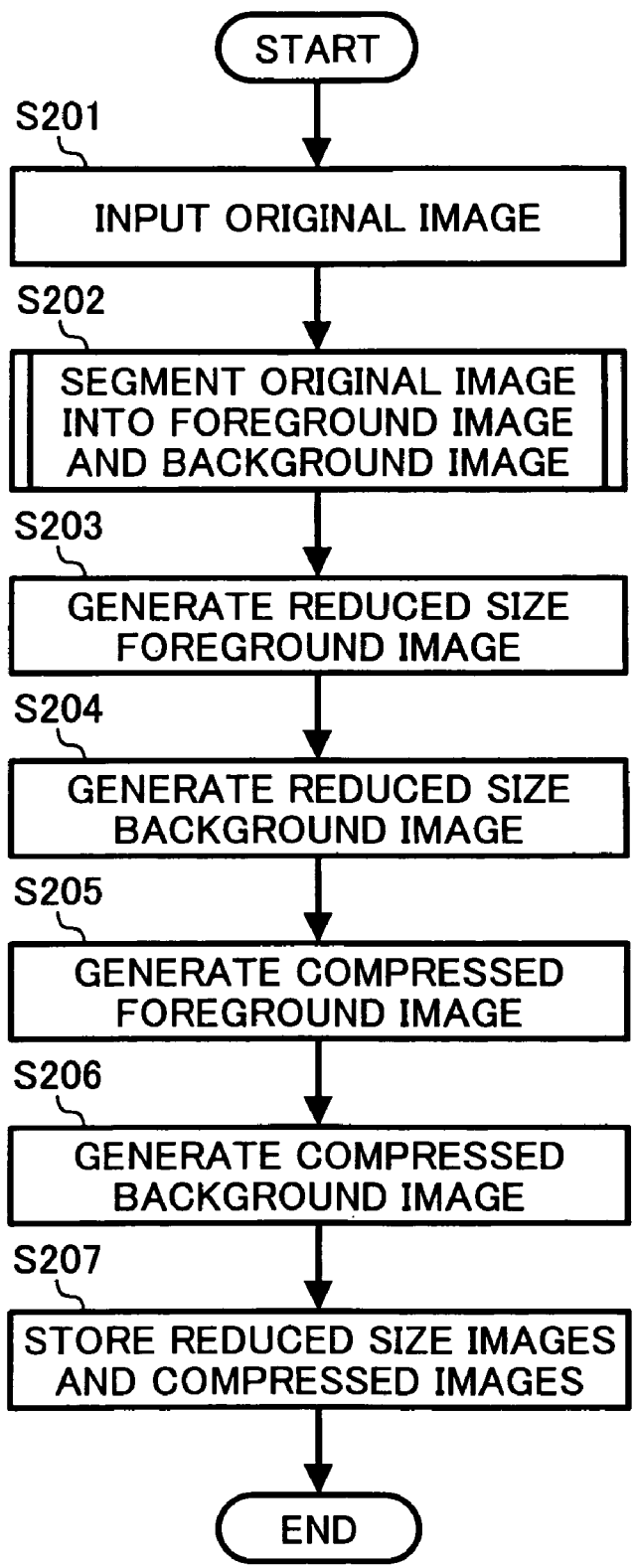
FIG. 15 is a flowchart illustrating an operation of reducing the size of a document image according to an exemplary embodiment of the present invention.
Figure 17:
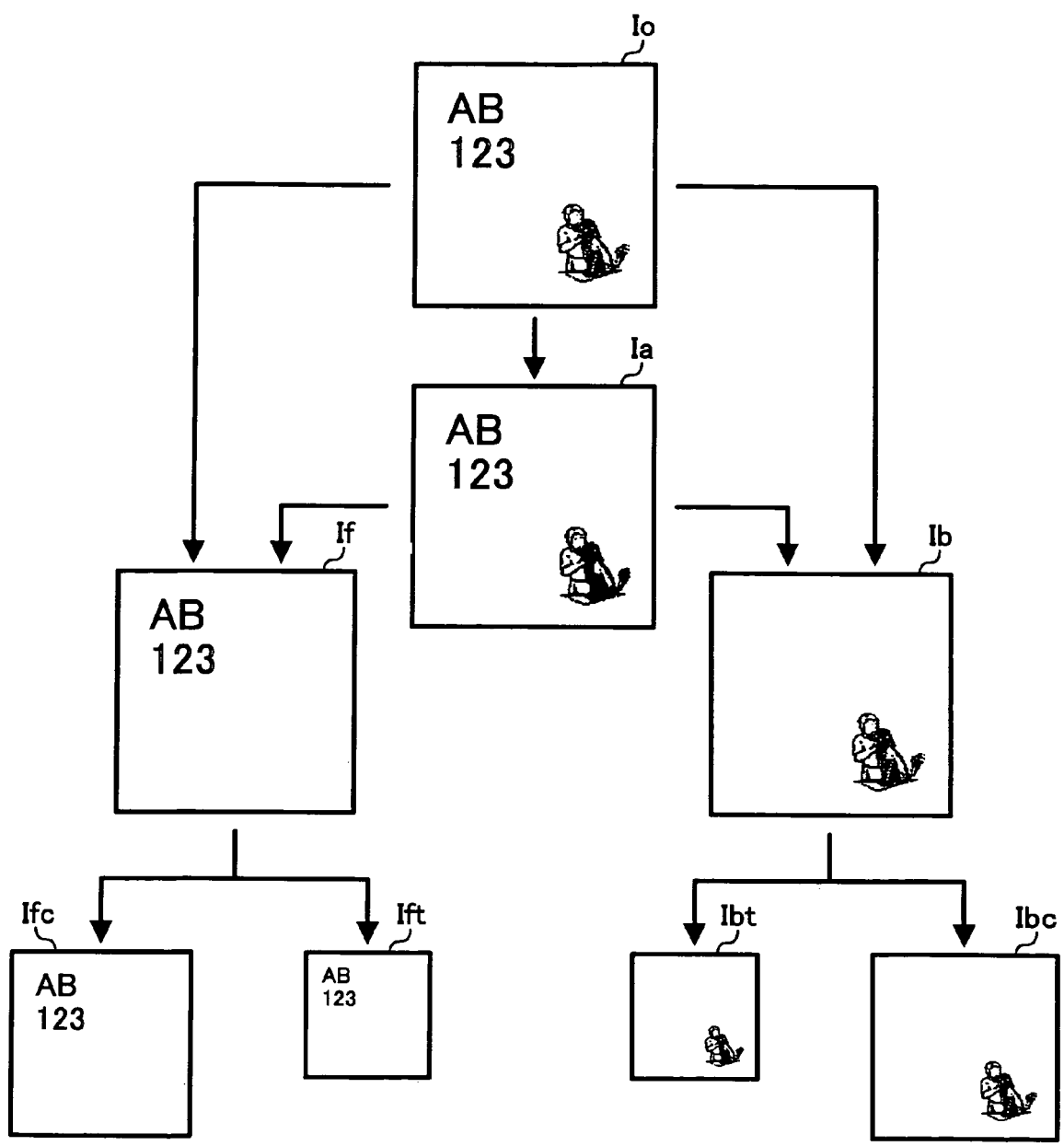
FIG. 17 is an illustration for explaining an operation of reducing the size of a document image, performed by the image processing apparatus shown in FIG. 16, according to an exemplary embodiment of the present invention.

Referring now to FIGS. 15 to 17, an operation of reducing the size of a document image is explained according to an exemplary embodiment of the present invention. In this example, the steps illustrated in FIG. 15 are performed by the image processing apparatus 30 of FIG. 16, or any kind of image processing system capable of functioning as the image processing apparatus 30 of FIG. 16, which may have the structure shown in FIG. 5 or 6.

As shown in FIG. 16, the image processing apparatus 30 includes the first size reduction processor 13, the second size reduction processor 14, the original image input 32, the image segmenter 33, the image compressor 36, the image combiner 37, and the storage 38. In this example, the image segmenter 33 includes a binary image generator 331, a first section extractor 332, a first image generator 333, and a second image generator 336.

Referring back to FIG. 15, Step S201 inputs an original image to be processed, such as the original multivalue image Io shown in FIG. 17. The original image Io of FIG. 17 contains a foreground section having a plurality of characters (indicated by "AB" in FIG. 17) and a plurality of numerals (indicated by "123" in FIG. 17). The portions of the original image Io other than the foreground section are referred to as a background section. As shown in FIG. 17, the background section of the original image Io may include a picture. Step S201 may be performed by the original image input 32.

Step S202 segments the original image Io into a foreground image If (FIG. 17) corresponding to the foreground section and a background image Ib (FIG. 17) corresponding to the background section. Step S202 may be performed by the image segmenter 33.

More specifically, in this example, the binary image generator 331 of FIG. 16 generates a binary image Ia shown in FIG. 17 from the original image Io. The first section extractor 332 of FIG. 16 extracts a section from the binary image Ia, which corresponds to the foreground section of the original image Io. The first image generator 333 of FIG. 16 generates the foreground image If from the original image Io, for example, by adjusting the values of the pixels contained in the portion other than the extracted section. The second image generator 336 of FIG. 16 generates the background image Ib from the original image Io, for example, by adjusting the values of the pixels contained in the extracted section.

Step S203 of FIG. 15 reduces the size of the foreground image If using a method suitable to the characteristics of the foreground image If to generate a reduced size foreground image Ift. Step S203 may be performed by the first size reduction processor 13.

Step S204 reduces the size of the background image Ib using a method suitable to the characteristics of the background image Ib to generate a reduced size background image Ibt. Step S204 may be performed by the second size reduction processor 14.

Step S205 compresses the foreground image If using a compression method suitable to the characteristics of the foreground image If to generate a compressed foreground image Ifc. Examples of such a compression method include MMR, JBIG, and JBIG2. Step S205 may be performed by the image compressor 36.

Step S206 compresses the background image Ib using a compression method suitable to the characteristics of the background image Ib to generate a compressed background image Ibc. Examples of such a compression method include JPEG and JPEG2000. Step S206 may be performed by the image compressor 36.

Step S207 stores the reduced size foreground image Ift, the reduced size background image Ibt, the compressed foreground image Ifc, and the compressed background image Ibc, in a corresponding manner. Step S207 may be performed by the storage 38.

The operation of FIG. 15 may be performed in various ways. For example, Steps S203, S204, S205, and S206 may be performed in different orders. Further, a step of combining the reduced size foreground image Ift and the reduced size background image Ibt may be performed before the Step S207 of storing. Furthermore, a step of combining the compressed foreground image Ifc and the compressed background image Ibc may be performed before the Step S207 of storing.

Referring now to FIGS. 15, 18, and 19, an operation of reducing the size of a document image is explained according to an exemplary embodiment of the present invention. In this example, the steps illustrated in FIG. 18 are performed by the image processing apparatus 30 of FIG. 18, or any kind of image processing system capable of functioning as the image processing apparatus 30 of FIG. 18, which may have the structure shown in FIG. 5 or 6.

As shown in FIG. 18, the image processing apparatus 30 includes the first size reduction processor 13, the second size reduction processor 14, the original image input 32, the image segmenter 33, the image compressor 36, the image combiner 37, and the storage 38. In this example, the image segmenter 33 includes the binary image generator 331, the first section extractor 332, the first image generator 333, a color analyzer 334, a first image segmenter 335, and the second image generator 336.

Referring back to FIG. 15, Step S201 inputs an original image to be processed, such as an original multivalue image Io shown in FIG. 19. The original image Io of FIG. 19 contains a foreground section having a plurality of characters (indicated by "AB" in FIG. 19) and a plurality of numerals (indicated by "123" in FIG. 19). The plurality of characters is assigned with the black color, while the plurality of numerals is assigned with a color other than black, such as a red color, for example. The portion other than the foreground section is referred to as a background section. As shown in FIG. 19, the background section of the original image Io may include a picture. Step S201 may be performed by the original image input 32.

Step S202 segments the original image Io into a foreground image If (FIG. 19) corresponding to the foreground section and a background image Ib (FIG. 19) corresponding to the background section. Step S202 may be performed by the image segmenter 33.

More specifically, the binary image generator 331 of FIG. 18 generates a binary image Ia shown in FIG. 19 from the original image Io. The first section extractor 332 of FIG. 18 extracts a section from the binary image Ia, which corresponds to the foreground section of the original image Io. The first image generator 333 of FIG. 18 generates the foreground image If from the original image Io, for example, by adjusting the values of the pixels contained in the portion other than the extracted section. The color analyzer 334 of FIG. 18 obtains color information of the pixels contained in the foreground section of the original image Io. The first image segmenter 335 of FIG. 18 segments the foreground image If into a plurality of images based on the color information. In the exemplary case illustrated in FIG. 19, the foreground image If is segmented into a first foreground image If1 containing the pixels with darker colors, and a second foreground image If2 containing the pixels with lighter colors. The second image generator 336 of FIG. 18 generates the background image Ib from the original image Io, for example, by adjusting the values of the pixels contained in the extracted section.

Step S203 of FIG. 15 reduces the size of the foreground image If using a method suitable to the characteristics of the foreground image If to generate a reduced size foreground image Ift. Step S203 may be performed by the first size reduction processor 13.

Step S204 reduces the size of the background image Ib using a method suitable to the characteristics of the background image Ib to generate a reduced size background image Ibt. Step S204 may be performed by the second size reduction processor 14.

In Step S205, the image compressor 36 compresses the first foreground image If1 using a compression method suitable to the characteristics of the first foreground image If1, such as the MMR method, to generate a first compressed foreground image If1c. Further, the image compressor 36 compresses the second foreground image If2 using a compression method suitable to the characteristics of the second foreground image If2 to generate a second compressed foreground image If2c.

Step S206 compresses the background image Ib using a compression method suitable to the characteristics of the background image Ib to generate a compressed background image Ibc. Examples of such a method include JPEG and JPEG2000. Step S206 may be performed by the image compressor 36.

Step S207 stores the reduced size foreground image Ift, the reduced size background image Ibt, the first compressed foreground image If1c, the second compressed foreground image If2c, and the compressed background image Ibc, in a corresponding manner.

The operation of FIG. 15 may be performed in various ways. For example, Steps S203, S204, S205, and S206 may be performed in different orders. Further, a step of combining the reduced size foreground image Ift and the reduced size background image Ibt may be performed before the Step S207 of storing. Furthermore, a step of combining the first compressed foreground image If1c, the second compressed foreground image If2c, and the compressed background image Ibc may be performed before the Step S207 of storing.

As described above in any one of FIGS. 14 to 19, the first size reduction processor 13 and the second size reduction processor 14 may be incorporated into an image compressing device, as is known in the art.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The invention claimed is:

1. A method for reducing a size of an original image using a processor to perform the steps of the method comprising:
segmenting the original image into a first image and a second image;
determining a first transformation method based on characteristics of the first image;
generating a first scaled image, having a smaller image size than the image size of the first image, from the first image, the first scaled image comprised of a plurality of first target pixels having respective values obtained using the first transformation method;
determining a second transformation method based on characteristics of the second image;
generating a second scaled image from the second image, the second scaled image comprised of a plurality of second target pixels having respective values obtained using the second transformation method; and
combining the first scaled image and the second scaled image into a reduced size image having a smaller image size than the image size of the original image,
wherein the first transformation method comprises:
specifying a position of each first target pixel in the first scaled image;
extracting, for each first target pixel, a plurality of pixels from the first image, which are located at a position corresponding to the position of the respective first target pixel in the first scaled image; and
calculating the value of the respective first target pixel in the first scaled image based on values of the plurality of pixels extracted from the first image.

2. The method of claim 1, wherein the first image corresponds to a foreground section of the original image, and the second image corresponds to a background section of the original image.

3. The method of claim 1, wherein the determining a first transformation method determines the first transformation method which causes the value of each first target pixel in the first scaled image to be equal to an average of the values of the respective plurality of pixels extracted from the first image.

4. The method of claim 1, wherein the determining a first transformation method determines the first transformation method which causes the value of each first target pixel in the first scaled image to be equal to a highest one of values of the respective plurality of pixels extracted from the first image when the first image corresponding to a foreground section of the original image contains pixels having dark color values.

5. The method of claim 1, wherein the determining a first transformation method determines the first transformation method to cause the value of each first target pixel in the first scaled image to be equal to a lowest one of values of the respective plurality of pixels extracted from the first image when the first image corresponding to a foreground section of the original image contains pixels having light color values.

6. The method of claim 1, further comprising:
displaying the reduced size image through a display device.

7. The method of claim 1, further comprising:
storing the reduced size image.

8. The method of claim 1, further comprising:
generating a first compressed image from the first image; and
generating a second compressed image from the second image.

9. The method of claim 8, further comprising:
storing the first compressed image, the second compressed image, and the reduced size image, in a corresponding manner.

10. An image processing apparatus, comprising:
means for inputting an original image;
means for segmenting the original image into a first image and a second image;
first reducing means for reducing an image size of the first image to generate a first scaled image having a smaller image size than the image size of the first image and comprised of a plurality of first target pixels having respective values obtained using a first transformation means determined based on characteristics of the first image; and
second reducing means for reducing an image size of the second image to generate a second scaled image having a smaller image size than the image size of the second image and comprised of a plurality of second target pixels having respective values obtained using a second transformation means determined based on characteristics of the second image,
the first transformation means including means for specifying a position of each first target pixel in the first scaled image, for extracting, for each first target pixel, a plurality of pixels from the first image. which are located at a position corresponding to the position of the respective first target pixel in the first scaled image and for calculating the value of the respective first target pixel in the first scaled image based on values of the plurality of pixels extracted from the first image.

11. The apparatus of claims 10, further comprising:
means for combining the first scaled image and the second scaled image into a combined reduced size image, wherein the combined reduced size image has a smaller image size than the image size of the original image.

12. The apparatus of claim 11, further comprising:
means for displaying the combined reduced size image.

13. The apparatus of claim 11, further comprising:
means for storing the combined reduced size image.

14. The apparatus of claim 10, further comprising:
means for storing the first scaled image and the second scaled image in a corresponding manner.

15. The apparatus of claim 10, wherein the first image corresponds to a foreground section of the original image, and the second image corresponds to a background section of the original image.

16. The apparatus of claim 15, wherein the first reducing means comprises:
means for dividing the first image into a plurality of first sections based on the image size of the first scaled image, wherein each of the plurality of first sections includes a plurality of pixels from the first image and has a plurality of pixel values;
means for obtaining a plurality of first representative values, each first representative value corresponding to a first section and derived from the plurality of pixel values of the respective first section using the first transformation method, and
wherein the second reducing means comprises:
means for dividing the second image into a plurality of second sections based on the image size of the second scaled image, wherein each of the plurality of second sections includes a plurality of pixels from the second image and has a plurality of pixel values;
means for obtaining a plurality of second representative values, each second representative value corresponding to a second section and derived from the plurality of pixel values of the respective second section using the second transformation method.

17. The apparatus of claim 16, wherein the means for obtaining a plurality of first representative values comprises:
means for calculating an average value of the plurality of pixel values of each first section.

18. The apparatus of claim 17, wherein the means for determining the first transformation method determines the first transformation method which causes each first representative value to be equal to the average value obtained by the means for calculating.

19. The apparatus of claim 18, wherein the means for determining the second transformation method determines the second transformation method which causes each second representative value to be equal to a selected target pixel chosen from the plurality of pixel values in the target second section, wherein the selected target pixel is located at a predetermined position in the respective second section.

20. The apparatus of claim 18, wherein the means for determining the second transformation method determines the second transformation method which causes each second representative value to be equal to a selected target pixel chosen from the plurality of pixel values in the respective second section, wherein the selected target pixel is randomly selected.

21. The apparatus of claim 18, wherein the means for determining the second transformation method determines the second transformation method which causes each second representative value to be equal to at least one value of a plurality of pixel values in the respective second section, wherein the at least one value has a highest frequency rate.

22. The apparatus of claim 17, wherein the means for obtaining a plurality of first representative values further comprises:
means for determining whether the average value is higher than a threshold value to generate a determination result,
wherein the means for determining the first transformation method determines the first transformation method which causes each first representative value to be selected from the plurality of pixel values of the respective first section based on the determination result.

23. The apparatus of claim 22, wherein the means for determining the first transformation method determines the first transformation method which causes each first representative value to be equal to a highest one of the plurality of pixel values of the respective first section when the determination result indicates that the average value is lower than a threshold value.

24. The apparatus of claim 22, wherein the means for determining the first transformation method determines the first transformation method which causes each first representative value to be equal to a lowest one of the plurality of pixel values of the respective first section when the determination result indicates that the average value is higher than a threshold value.

25. The apparatus of claim 17, wherein the means for determining the second transformation method determines the second transformation method which causes each second representative value to be equal to an average value of the plurality of pixel values in the respective second section.

26. The apparatus of claim 10, wherein the means for segmenting comprises:
means for converting the original image into a binary image, wherein the first image and the second image are segmented using the binary image.

27. The apparatus of claim 10, further comprising:
means for compressing the first image to generate a first compressed image; and
means for compressing the second image to generate a second compressed image.

28. A computer readable medium encoded with computer instructions which cause a computer to perform a method of reducing a size of an original image, the method comprising the steps of:
inputting the original image;
segmenting the original image into a first image and a second image;
determining a first transformation method based on characteristics of the first image;
generating a first scaled image, having a smaller image size than the image size of the first image, from the first image, the first scaled image comprised of a plurality of pixels having respective values obtained using the first transformation method;
determining a second transformation method based on characteristics of the second image; and
generating a second scaled image, having a smaller image size than the image size of the second image, from the second image, the second scaled image comprised of a plurality of pixels having respective values obtained using the second transformation method,
wherein the first transformation method comprises:
specifying a position of each first target pixel in the first scaled image;
extracting, for each first target pixel, a plurality of pixels from the first image, which are located at a position corresponding to the position of the respective first target pixel in the first scaled image; and calculating the value of the respective first target pixel in the first scaled image based on values of the plurality of pixels extracted from the first image.

29. An image processing system, comprising:

a processor;

a storage device configured to store a plurality of instructions which, when activated by the processor, causes the processor to input an original image;

segment the original image into a first image and a second image;

determine a first transformation method based on characteristics of the first image;

generate a first scaled image, having a smaller image size than the image size of the first image, from the first image, the first scaled image comprised of a plurality of pixels having respective values obtained using the first transformation method;

determining a second transformation method based on characteristics of the second image; and generate a second scaled image, having a smaller image size than the image size of the second image, from the second image, the second scaled image comprised of a plurality of pixels having respective values obtained using the second transformation method, wherein the first transformation method comprises:

specifying a position of each first target pixel in the first scaled image;

extracting, for each first target pixel, a plurality of pixels from the first image, which are located at a position corresponding to the position of the respective first target pixel in the first scaled image; and calculating the value of the respective first target pixel in the first scaled image based on values of the plurality of pixels extracted from the first image.

* * * * *